INVENTOR.
NATHAN C. PRICE
BY George C. Sullivan
Agent

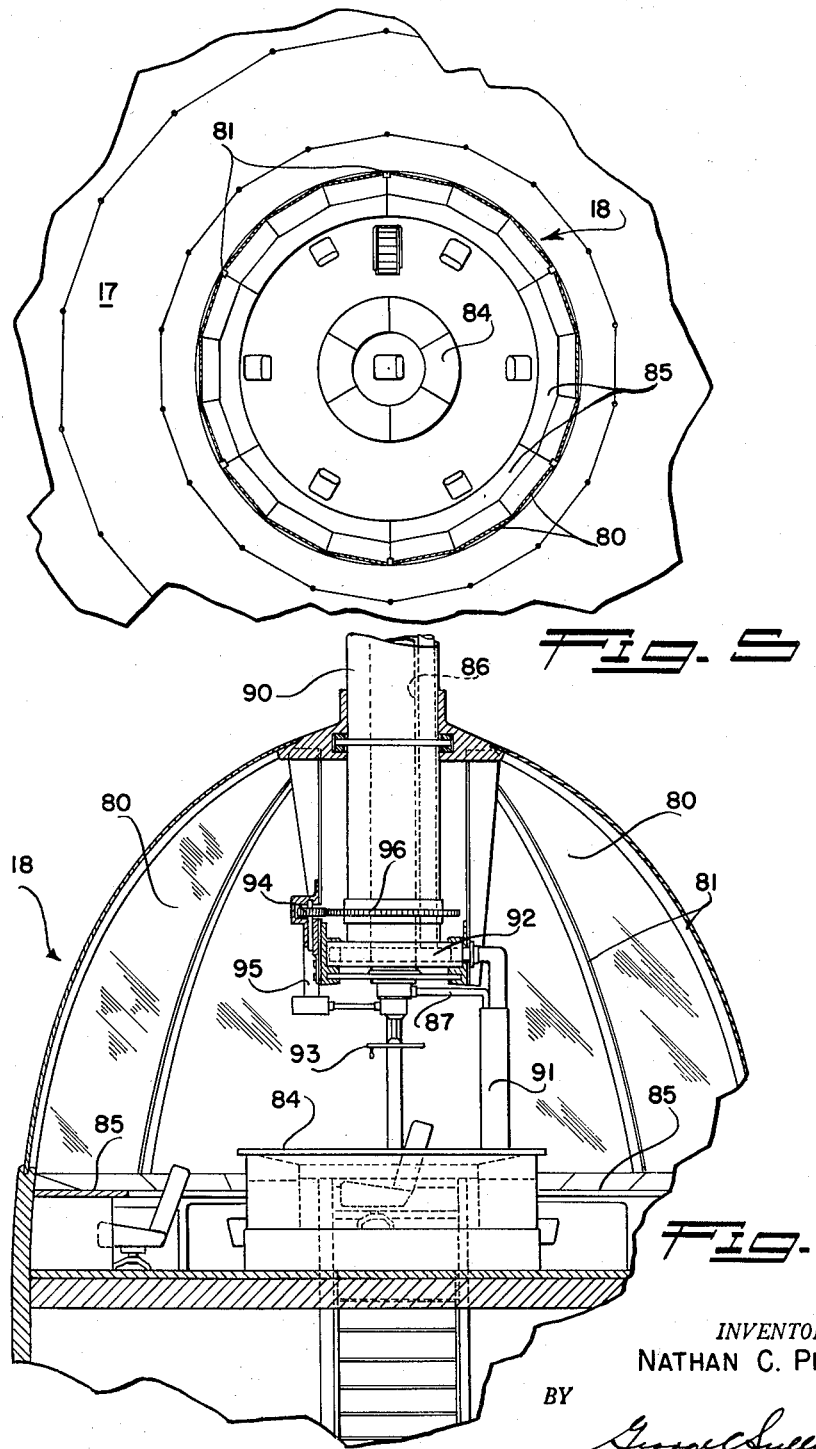

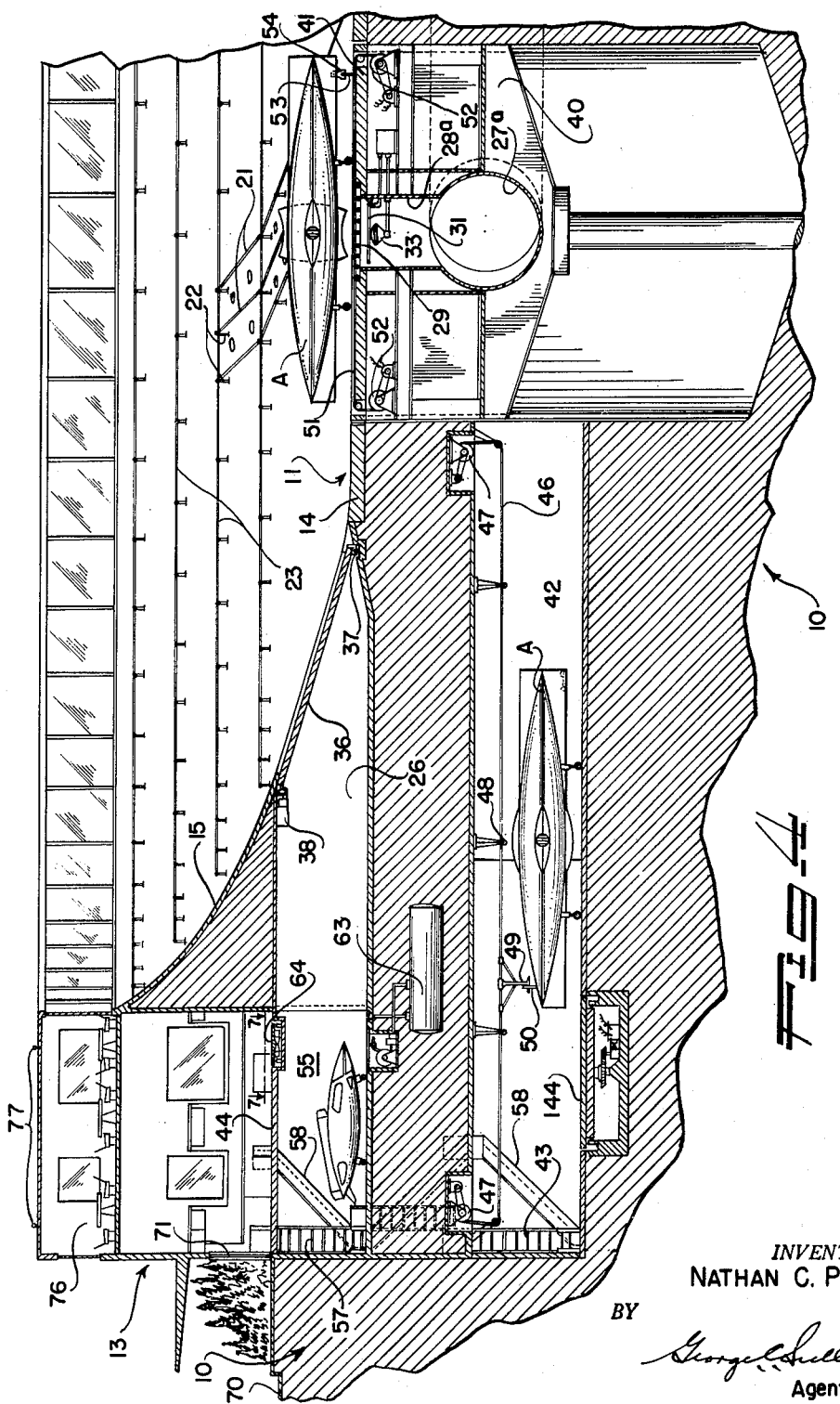

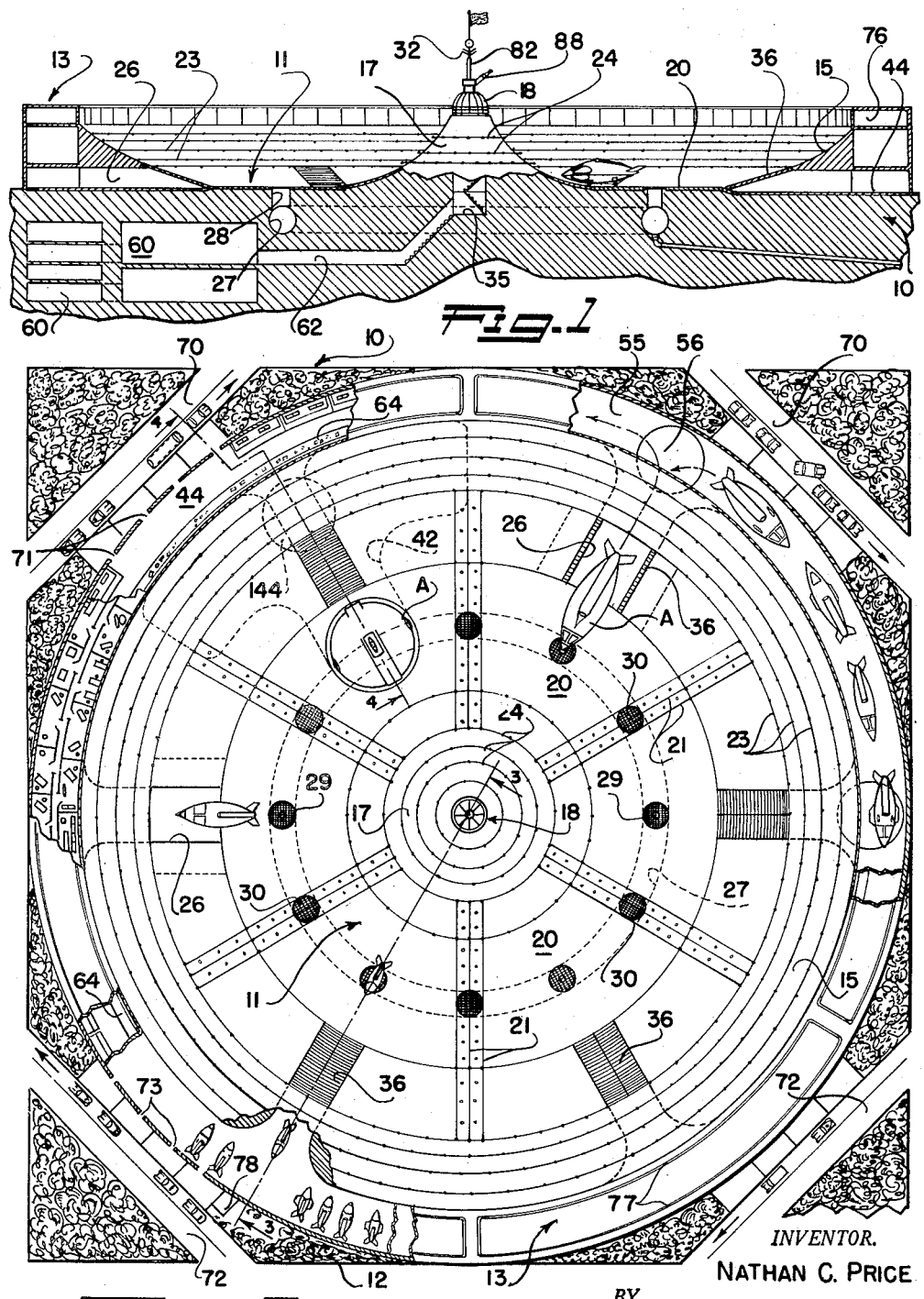

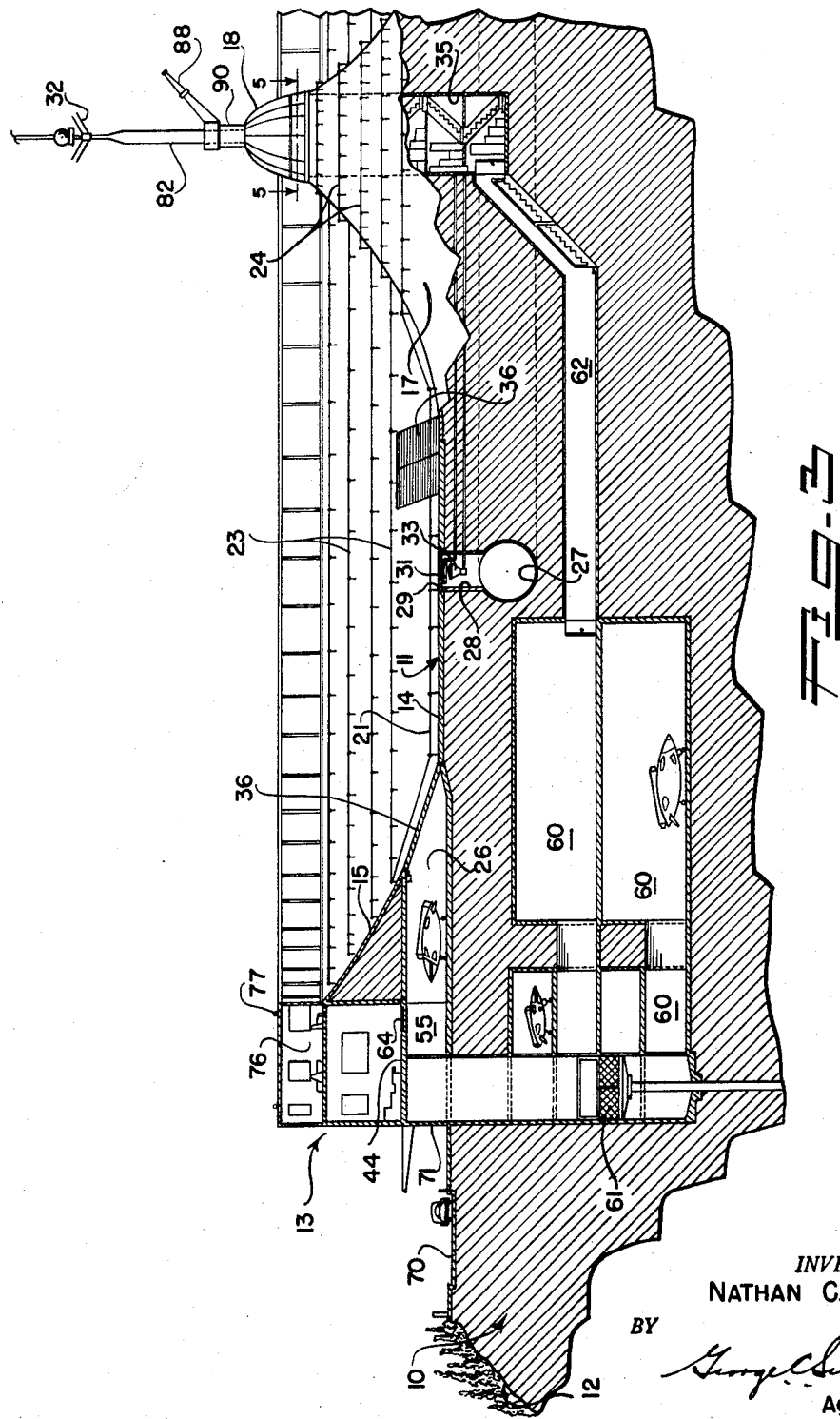

United States Patent Office 2,957,660
Patented Oct. 25, 1960

2,957,660

AIRPORT FOR VERTICALLY ASCENDING AND DESCENDING AIRCRAFT

Nathan C. Price, Hotel Prince Luis Moya 12, Mexico City, Mexico

Filed Sept. 17, 1956, Ser. No. 611,409

11 Claims. (Cl. 244—114)

This invention relates to airports and relates more particularly to terminals or airports for use by aircraft designed for and capable of vertical or "steep" ascent and descent. It is a general object of this invention to provide airports of this kind which obviate or avoid the difficulties, shortcomings and inconveniences of the present-day airports.

In air travel at the present time a substantial portion of the overall travel time is dissipated or wasted due to the remoteness of the airports from the centers of population, which usually constitute the initial points of departure and the ultimate destinations of the travelers. The passenger is obliged to travel several miles by bus or car from his hotel or home through the congested city traffic to the airport in order to board the airplane and at the end of his flight must repeat this time consuming and aggravating procedure in order to reach his final destination. Although the airports are often originally built at or beyond the limits of the metropolitan areas, suburban portions of the city soon build up around or adjacent the airports. As a consequence, large numbers of people living and working in the vicinity of the airports are annoyed by the high intensity sound or noise generated by the arriving and departing airplanes, the taxiing and running-up of their engines, and are necessarily endangered by the low flying departing and approaching airplanes.

Aircraft designed to takeoff and land vertically or at steep angles of climb and glide are now being proposed and introduced which, theoretically at least, will permit the airports to be much smaller in area than at present and this factor may allow the airports to be located closer to the city-centers. However there will still remain the problems of the safety of those living and working near the airports and of the annoyance created by the high level noise of the operating aircraft. These remaining factors may very well require that the airports remain at locations remote from the city-centers or densely populated areas.

An object of the invention is to provide an airport for vertical rising and descending aircraft that substantially alleviates the two major problems of safety of the population and the objectionable aircraft noise. The airport is constructed to permit straight line approach of incoming aircraft with no "stacking up" or local maneuvering and immediate landing in the airport after such an approach with little or no external taxiing. Upon departure the aircraft takes off immediately with no external taxiing to fly away in a straight line departure. These operations made possible by the airport greatly reduce the above named hazards and annoyances.

Another object of the invention is to provide an airport of this kind constructed so as to direct or focus, upwardly into the atmosphere, all aircraft noise accompanying takeoff and landing and to absorb or deaden to a substantial degree noise generated externally of the airport by the rapidly and steeply descending and ascending craft.

Another object is to provide an airport of the class described that includes a relatively small landing area elevated above the surrounding terrain and enclosed by a circular or encompassing mound or structure. This combination of the elevated field and the surrounding mount or structure effectively directs the aircraft noise upwardly and away from the surrounding area. The relatively small size of the installation, the noise baffling and directing features and the direct rapid fly-away and approach features mentioned above well adapt the airport for location in or adjacent the city-center region so as to alleviate and reduce to a minimum ground travel time of the aircraft passengers.

Another object of the invention is to provide an airport of this kind incorporating means for housing the aircraft for servicing, refueling, repair and storage and for the rapid movement of the departing craft from within the structure to the small takeoff area and the immediate movement of arriving craft from the field into the structure. These features leave the active area or field free and clear at all times except for the expeditious movement of the craft to and from the vertical takeoff and landing centers. Conveyors, elevators and turntable means are combined to effect these advantages.

Another object is to provide such an airport including landing and takeoff beam means and illumination means at the landing and takeoff spots together with a central control tower and beam emanating means monitored therefrom forming flight paths to and from the airport, all functioning to expedite safe, rapid takeoff and landing of the craft.

Another object is to provide an airport of this kind having conveyor means, escalators, and the like, for the convenience of the passengers, and conveyors, etc. for the handling of their baggage, together with convenient airline facilities, automobile passenger loading and unloading ramps, and other similar facilities, all contributing to the handling of the passengers and their baggage.

A further object of the invention is to provide such an airport having emergency and safety means such as arresting cables for stopping craft that may over-travel their locations, fire-fighting equipment, observers and captains' stations and consoles, and efflux vents and ducts for the engine gases which further reduce the aircraft noise level and carry away the dangerous and noxious exhaust gases.

Other objectives and features of the invention will become apparent from the following detailed description of a typical preferred form and application thereof illustrated in the accompanying drawings in which:

Figure 1 is a vertical sectional view of an airport of the invention with a portion of the central island and tower appearing in side elevation;

Figure 2 is a top or plan view with certain portions broken away to illustrate several levels of the structure;

Figure 3 is an enlarged fragmentary vertical sectional view taken substantially as indicated by line 3—3 on Figure 2;

Figure 4 is an enlarged fragmentary vertical sectional view taken as indicated by line 4—4 on Figure 2;

Figure 5 is an enlarged fragmentary horizontal sectional view taken substantially as indicated by line 5—5 on Figure 3 illustrating the control tower;

Figure 6 is a fragmentary vertical sectional view of the control tower with the means for controlling or directing the fire-extinguishing nozzle appearing in side elevation;

Figure 9:
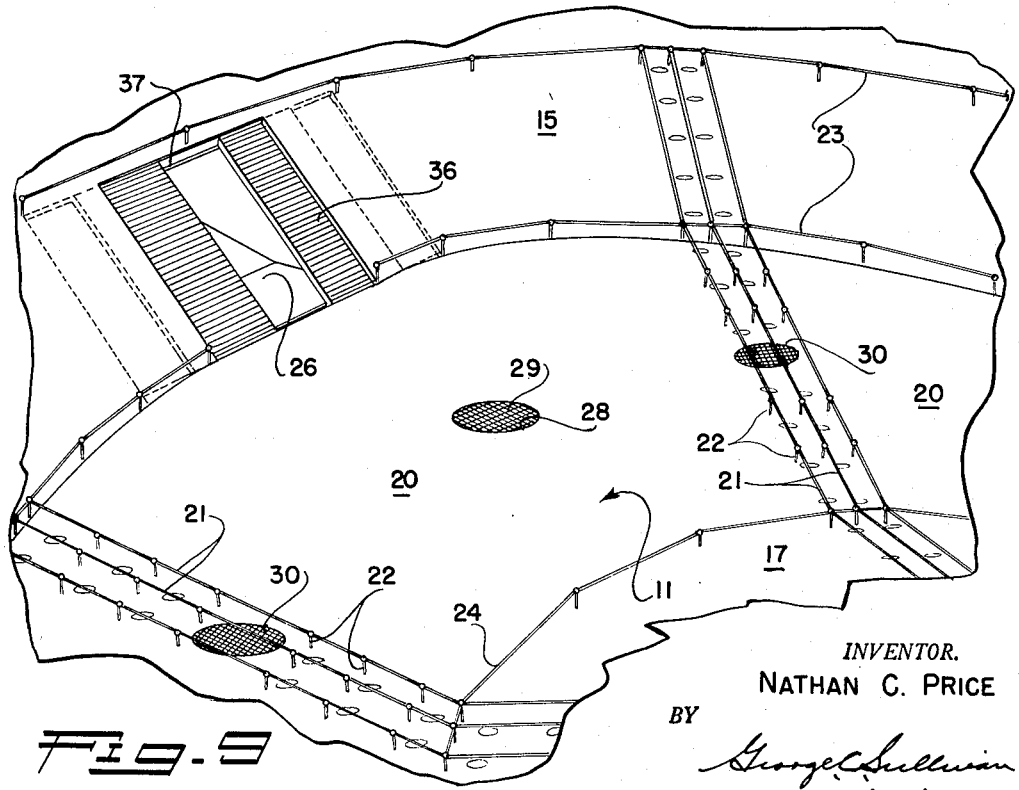
Figure 9 is an enlarged fragmentary perspective view of a portion of the airport illustrating the arresting cable arrangement and the aircraft receiving tunnel doors and a landing and takeoff location.

The invention may, of course, be embodied in airports varying considerably in dimensions, materials, relative proportions, etc. depending upon the intended usages, geographical location, and size and type of aircraft to be handled, and like factors. In the drawings I have shown a typical form of the invention built upon or incorporating a natural or artificial knoll or mount 10 of earth. It will be apparent that instead of utilizing this hill or mound 10 the airport may be provided on a building or similar artificial structure, the invention contemplating an elevation, here shown as a hill or mound 10, presenting on its top a generally horizontal landing and takeoff area or field 11 elevated above the surrounding terrain and/or city buildings and structures. The sides 12 of this hill or mound 10 preferably slope upwardly at a relatively steep angle, and are covered or provided with plantings or foliage. The sloping sides 12 serve to divert or direct the sound emanating from approaching and departing aircraft upwardly and away from the surrounding or adjacent homes, buildings, etc. and the plantings on the slope serve to absorb, to a considerable extent, the sound energy and, therefore, appreciably reduce the intensity of the reflected or redirected sound. The airport further includes a structure or building 13 on the top of the mound 10 encircling the landing field 11. Where the field 11 is circular, as illustrated, the building 13 may also be circular or annular to surround the field, it being understood the field need not be truly circular, for example, it may be oval, in which case the building 13, or at least the internal configuration thereof, will follow or conform to the periphery of the field. The circular or annular configuration of the airport and more particularly the walls or portions thereof defining the periphery of the landing zone has certain distinct advantages. This shape is particularly effective in directing or focusing the aircraft noises upwardly from the field 11 into the atmosphere to produce a minimum of annoyance and in protecting the field and the craft thereon against cross winds and natural air currents. The field 11 has a suitable surfacing 14 and the internal wall of the building 13 is sheathed or covered with appropriate protective covering. As clearly illustrated in Figures 3, 4 and 9, the inner abutment or wall 15 of the building 13 slopes downwardly and inwardly from adjacent the top of the building to the field 11. This wall 15 may be a wall of the building proper or may be the top portion of the mound 10 or an earth fill on the top of the mound. This fill or portion of the mound 10 constitutes a good insulator and a dependable protective barrier to guard the building proper 13 against aircraft that may over-travel or crash adjacent the field and acoustically isolates the building from the field proper. The internal features of the building 13 will be later described.

The airport is further characterized by a central raised region 17 provided at its upper end with a control booth or tower 18. The surface of this central region 17 curves upwardly and radially inward to the control tower 18 and is suitably surfaced. The tapering or conical central region 17 preferably has a height greater than that of the fill or building wall 15 so that the tower 18 thereon rises above the top of the building 13 to provide adequate vision for the occupants or personnel. The central region 17 may be a portion of the natural mound 10 properly contoured, or may be an earth fill, or an artificial structure of masonry, steel, frame construction, or the like. The active airport landing field 11 is a horizontal annular zone defined or bounded by the upwardly and outwardly sloping annular wall 15 and the upwardly and inwardly convergent surface of the central region 17, the surfaces of the field, wall 15 and central region 17, constituting a particularly effective sound energy reflecting means for focusing or directing the aircraft noises upwardly into the upper atmosphere.

The field 11 has a plurality of circumferentially spaced or arranged landing areas 20, see Figure 2. These areas 20 may each be employed to accommodate aircraft of a given type or of given airlines and the areas are preferably divided or separated by series of radially extending arresting cables 21. The cables 21 are carried by posts 22 and many continue some distance up the wall 15 and the central region 17 so as to extend from adjacent the tower 18 to adjacent the surrounding building 13. Spaced annular emergency fences of post-supported arresting cables 23 are provided on the outer wall 15 of the airport or field and similar, although somewhat more numerous annular lines or fences 24 of post-supported arresting cables are provided on the raised central region 17. The cables 21 which separate the landing and departure areas 20 are arranged generally radially with respect to the annular field 11 and extend between and connect the lower cables 23 and 24. It will be seen how the arrangement of arresting cables 21, 23 and 24 mark off or define the several departure and landing areas 20 and constitute safety or protective means for stopping over-travel of any incoming or departing aircraft with a minimum of damage.

At least one tunnel or passage 26 extends radially and generally horizontally through what I have termed the wall 15 from each departure and landing area to the interior of the mound 10 or building 13. The passages 26 are shaped and made sufficiently large to admit and pass the aircraft A that are to be moved to and from the areas 20. If desired or found necessary the capacity or size of the passages 26 or certain of them may differ in accordance with the size and type of the aircraft A that will use the respective areas 20. Thus in Figure 2 it will be observed that at least one of the passages 26 is large or wide in the circumferential direction to receive large aircraft A, for example aircraft of the type employed for trans-ocean or trans-continental travel. The other passages 26 are shown of medium size.

Since vertically ascending and descending aircraft often employ downwardly directed propulsive jets of air and combustion gases, I prefer to provide means at the areas 20 to receive these high velocity, high temperature, noise producing jets. This means includes a duct or tunnel 27 in the mound 10 below the surface of the field 11. The tunnel 27 is substantially annular to pass beneath the several areas 20 and has at least one jet blast receiving riser or entrance 28 open at each departure and landing area 20. Appropriate gratings 29 are provided for the upper ends of the blast tunnel entrances 28. The tunnel 27 is also provided with exits or vents 30. In the drawings these vents 30 extend upwardly from the tunnel 27 to discharge into the atmosphere at or below the radial arresting cables 21 where the efflux gases will be remote from the aircraft A which are normally "spotted" at or adjacent the blast receiving gratings 29. It will be seen that the system of the tunnel 27 and its entrances 28 and vents 30 materially deadens or absorbs the noise of the aircraft propulsive jets or blasts.

The blast tubes or entrances 28 may serve as landing points or targets for the arriving aircraft and I provide flight path beam emitters and identification lamps at these blast entrances. Antennas 31, for emitting conical ultra high frequency beams, are positioned at or in the mouths of the blast entrances 28. Each antenna 31 is operable to emit an ultra high frequency vertical sweep beam for control of the flight path to and from the respective landing areas. These beams may be used in conjunction with flight path beams emitted from antennas 32 on the central tower 18 to facilitate the safe departure and landing of the aircraft A. To further identify the several field areas 20 distinctive identifying lamps 33 are provided in the blast entrances 28.

The outer ends of the tunnels 26 are normally closed by metal doors 36 movably supported by track and roller means 37 to lie substantially flush with the wall 15. Power means 38 are provided to actuate or move the doors between their open and closed positions.

As above described, the tunnels 26 may be proportioned to receive or pass airplanes of different proportions. In the event the airport is intended to service large, long range aircraft, it may be desirable or necessary to provide at least one of the alighting and takeoff areas 20 with an elevator system for moving the craft vertically to and from the area. Thus, as shown in Figure 4, there may be provided an elevator 40 movable vertically in the mound 10 and having a platform 41 on its top for supporting the aircraft A. The elevator 40 carries the blast exhaust grid 29 and a blast exhaust tube 28ª communicating with a section 27ª of the exhaust tunnel 27, so that when the platform 41 is flush with the field surfacing the tunnel section 27ª is in direct communication with the remainder of the exhaust blast tunnel 27. An antenna 31 and lamp 33, such as above described, are associated with the blast exhaust tube 28ª. When the elevator 40 is moved downwardly its platform 41 comes into alignment with the floor of a subterranean room or compartment 42. This compartment 42 is intended to receive and house the large aircraft A and provides a convenient area for the passengers to board and leave the airplanes. Elevator or escalator means 43 extend between the compartment 42 and the main floor level 44 of the building 13 which will be more fully described hereinafter. Tractor or conveyor means are provided on the elevator 40 and in the compartment 42 to facilitate movement of the aircraft A. The outer portion of the compartment 42 may have lateral enlargements or rooms for the repair, servicing and storage of the large aircraft and a power driven turntable 144 is provided in the outer part of the compartment 42 to turn or orient the airplanes when they are transported or moved from the inner portion of the compartment to its lateral rooms. Tractor or other facilities may be employed to move the aircraft in the enlarged outer portion of the compartment 42 and to move them to and from the turntable 144. However, I prefer to provide a power driven conveyor means for moving the aircraft radially in the compartment 42 between the turntable 144 and the elevator 40. This may take the form of a cable 46 operated by motor driven drums 47 and supported by pulleys 48 to extend horizontally adjacent the roof of the compartment 42. The cable 46 carries an arm 49 adapted to engage with a retractable lug 50 on the aircraft A so as to move the aircraft A across the floor of the compartment 42 when the cable 46 is operated. The cable 46 extends from adjacent the elevator 40 to beyond the turntable 144 so that the arm 49 may move the aircraft from the elevator 41 to a position where its landing gear rests on the turntable. The conveyor means on the elevator 40 comprises a cable 51 operating in a horizontal groove in the elevator platform 41 and driven or actuated by power operated drums 52. The cable 51 has an arm 53 for engaging with a retractable lug 54 on the underside of the aircraft A to move the aircraft across the surface of the elevator platform 41 from a central position thereon to a position where it enters the compartment 42 for engagement by the arm 49 on the conveyor cable 46. The power means or motor drives for the elevator 40, the turntable 144, the conveyor cable 46 and the conveyor cable 51, may be controlled from the immediate vicinity or may be controlled from the control tower 18 or both.

Referring now to the tunnels 26 for the smaller, medium, and average size aircraft A, these tunnels may or may not be equipped with conveyor or aircraft moving systems such as the cable and drum system 46—47 above described. When such systems are not provided in the tunnels 26 the aircraft may move through the tunnels under their own power or are moved by motorized tractors. The several tunnels 26 lead radially outward to a circular basement 55, which may be directly under the annular building 13. Turntables 56 are provided at the junctions of the tunnels 26 with the circular basement 55, particularly at those tunnels designed to handle the larger or medium sized aircraft, the turntables being useful in changing the positions of the craft for movement to and out of the tunnels and basement. The turntables 56 may be similar to the motorized turntable 144, above described. The basement 55 is adapted to be used by the passengers in boarding and leaving the airplanes and escalators 57 are provided to carry the passengers both upwardly and downwardly between the basement 55 and the main concourse floor 44. Baggage conveyors 58 also extend between the concourse floor 44 and the departure and arrival basement 55. In practice, one or more escalators 57 and baggage conveyors 58 are preferably provided for each airline or for each landing and departure area 20 of the field which, in turn, each have a tunnel 26 leading to the basement 55. In addition to the basement, the hill or mound 10 is provided with several lower level spaces or rooms 60 useful as storage areas, repair shops, etc. Elevators 61 are adapted to move the aircraft from between the basement 55 and these rooms 60. The rooms 60 at the same levels are preferably interconnected one with the other and passages 62 preferably connect the rooms with the well or office area 35 of the tower 18. Fuel storage and dispensing facilities 63 are provided in the mound 10 to supply fuel to the aircraft at selected levels or rooms and at the basement 55. From the foregoing it will be seen that the hill or mound 10 is provided with internal or subterranean tunnels, basements, and rooms for storage, servicing, repairing, refueling, and loading and unloading of the aircraft. Because these areas are all within the hill 10 they leave the field 11 and its approaches or tunnels 26 free and clear of aircraft at all times except during actual takeoff and landing.

Figure 7:
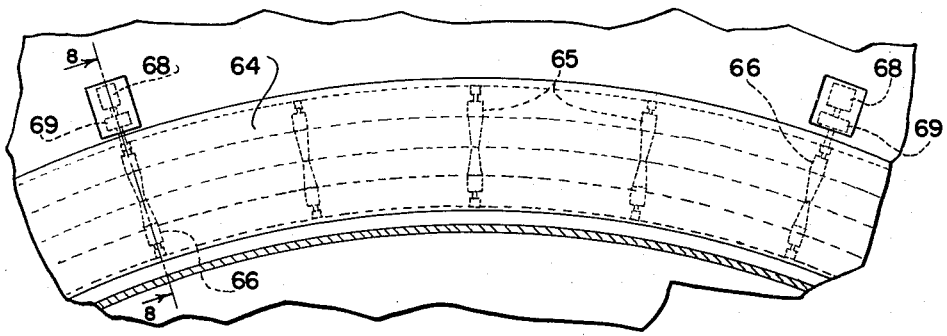
Figure 7 is an enlarged fragmentary plan view illustrating the passenger conveyor.
Figure 8:
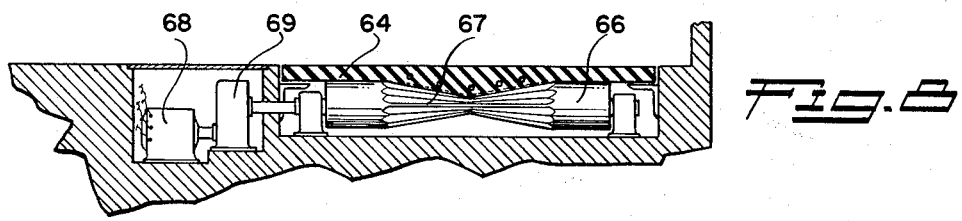
Figure 8 is an enlarged fragmentary vertical sectional view taken substantially as indicated by line 8—8 on Figure 7 illustrating the means for supporting and driving the passenger conveyor.

As above described, the building 13 has a main floor or concourse 44 for the convenience and use of the passengers. This circular or annular floor or space 44 contains the airline counters and other facilities. The abovementioned escalators 57 and baggage conveyors 58 lead from this floor 44 to the embarking areas of the basement 55. To facilitate passenger movement from one escalator 57 to another and from one airline counter to another as during transfer from one airplane to another, a circular horizontal conveyor 64 is provided in the main concourse 44 at approximately floor level. The conveyor 64, which is shown in Figures 7 and 8, is a flat topped horizontal annular member or assembly of rubber, fabric, or like materials, supported for movement by horizontally arranged rollers 65 and is driven or moved circumferentially by similar power driven rollers 66. The supporting rollers 65 are circumferentially spaced and are arranged to have their axes substantially radial with respect to the axis of curvature of the concourse 44, which is approximately the central vertical axis of the tower 18. There is preferably a plurality of the driving rollers 66 and the driving rollers 66 are spaced between groups or sets of the supporting rollers 65. The rollers 65 and 66 are preferably of "hour-glass" shape, having generally cylindrical end regions and portions 67 tapering therefrom to their medial planes, see Figure 8. The tapering parts 67 of the driving rollers 66 are toothed or serrated and the underside of the conveyor 64 has a thickened portion with convergent surfaces mating and engaging with these tapered surfaces. The rollers 66 are driven by electric motors 68 through the medium of speed reducing drives 69 recessed in the floor of the main concourse 44. In practice the circular passenger and baggage conveyor 64 of the main concourse is continuously moving or rotating at a relatively slow speed, say at 5 miles per hour, and the passengers may step on and off the conveyor at will so as to conveniently travel from one location to another in the concourse.

Referring now to Figures 2 and 3 of the drawings it will be seen that automobile ramps 70, on the sides of the hill or mount 10, lead to the main concourse 44 at spaced points, say at two adjacent corners of the generally rectangular piece of ground occupied by the airport. These ramps 70 permit automobiles, busses, and other public conveyances, to pick up and discharge passengers at the entrances 71 of the main concourse 44. Again referring to Figures 2 and 3, automobile ramps 72 on the sides of the mount 10 lead to entrances 73 of the above described basement level 55. These automobile ramps 72 may be used by passengers of executive airplanes and private aircraft and the tunnels 26 communicating with the basement 55 at and adjacent these ramp entrances 73 extend to areas 20 of the field reserved for or used by such relatively small aircraft.

The upper floor 76 of the building 13 may be occupied by executive offices, restaurants, waiting lounges, shops, etc. A circle 77 of lamps or fluorescent tubes is preferably provided on the top of the building 13 to constitute a large visual marker for the airport. Elevators 78 may be provided in the building 13 and the mount 10 adjacent the entrances 73 and the ramps 70 and 72 to facilitate the movement of passengers to and from the car ramps and public transportation systems such as subways, not shown. It is to be understood that the several levels, tunnels, compartments, etc. of the airport through which the aircraft A are moved and where they are serviced, repaired and stored, are equipped with the overhead power actuated cable systems 46—47 for moving the aircraft from place to place and each of the passenger accommodating floors and levels may be provided with a conveyor 64 and with suitable escalators 57 conveniently located to move the passengers from floor to floor.

The observation and control tower 18 is provided on the top of the central raised region 17 to overlook the entire exposed active portion of the airfield. The tower 18 preferably houses the various controls for the power driven equipment in the mound 10 and building 13 as well as the controls for the flight path beams used by the aircraft during approach, landing and departure operations, radar equipment, radio controls, and so forth. The inhabited upper portion of the tower 18 is generally hemispherical and composed of segmental panels 80 of glass or other transparent material, and structural ribs 81 therebetween which support or assist in supporting the vertical mast 82. The upper portion of the mast 82 carries the antenna 32 for the flight path beam energy transmitting and reception, for radio reception and transmission, radar reception and transmission, etc. A central desk 84, see Figures 5 and 6, is provided in the control tower for the airport captain and counters or desks 85 are provided around the margin of the circular room for the personnel controlling the arrivals, departures, and other activities at the several field areas 20. There is a desk 85, or a set of desks 85, for each landing field area 20 and the desks are preferably radially aligned with their respective areas so that the personnel have a clear, direct view of the area under their control. The several wires or leads for the antennas 32 may extend through a central tube 86 of the mast 82 and through a conduit 87, passing downwardly into the tower structure. Fire fighting apparatus may be associated with the mast 82. I have shown a rotatable and directable nozzle 88 projecting from the lower portion of the mast. This portion of the mast 82 has a surrounding pipe 90 for fire extinguishing medium under pressure. The pipe 90 is rotatable and is supplied with fire extinguishing medium by a pipe 91 extending from a source of the medium, not shown, to a swivel fitting 92 at the lower end of the vertical pipe 90. Any appropriate means, either motorized or manual, may be employed to rotate the pipe 90 and the nozzle 88. In Figure 6 there is illustrated a manually rotatable wheel 93 accessible to the captain at the desk 84 for rotating or driving a pinion 94 through a gear train and speed reducing mechanism 95. The pinion 94 meshes with an annular gear 96 fixed on the lower portion of the pipe 90. The nozzle 88 is such that the fire extinguishing medium discharged therefrom may reach any portion of the field 14 or building 13.

It is believed that the operation and features of the airport of this invention will be apparent from the foregoing detailed description. The airport being generally circular, permits the aircraft to approach radially and directly to their respective field areas 20 and to takeoff and flyaway in similar radial paths, thus avoiding maneuvering and "stacking up" over the populated areas. Accordingly, the noise and inconvenience of aircraft traffic over the city is greatly minimized. Furthermore, the bowl-like configuration of the airport greatly reduces the effect of cross winds, the air within the building 13 and walls 16 being substantially quiescent at all times so that wind conditions have little or no effect upon the airfield operations. The tunnels, compartments, etc. of the airport make is possible to keep the field proper clear of aircraft except during the actual takeoff and landing thereof, the aircraft being immediately moved into the tunnels 26 upon landing and immediately taking off upon leaving the tunnels.

The above described facilities for the handling of the aircraft, the passengers and their baggage, together with the car ramps 70 and 72 leading directly to the entrances of the building 13, promote the convenient, rapid handling of the passengers and passenger traffic. The aircraft traffic at each field area 20 is readily controlled by the personnel at the desks or consoles 85, the entire operation at any such area 20 being fully visible from the respective desk 85. Furthermore, the captain who has full view of the entire field has overall control of the operations. Each field area 20 is identified by the colored lamp 33 at its grid 30 and the circular field itself is marked by the annular luminous tubes 77.

Having described only typical features of the invention I do not wish to be limited to the specific details herein set forth but wish to reserve to myself any variations or modifications that may appear to those skilled in the art and fall within the scope of the following claims.

I claim:

1. An airport for aircraft capable of steep angled takeoff and landing comprising a generally horizontal field to be used by the aircraft during takeoff and landing, a raised generally circular mound encircling the field and presenting an inner surface sloping upwardly and outwardly from the field, the field being divided into individual takeoff and landing areas, aircraft receiving compartments in the mound having tunnels leading through said surface to said areas, and doors for closing said tunnels and adapted to lie substantially flush with said inner surface of the mound.

2. An airport for aircraft capable of steep angled or vertical takeoff and landing employing downwardly directed propulsive fluids comprising a generally horizontal field to be used by the aircraft during takeoff and landing, a raised mound around the field protecting the field against cross winds, the field being divided into segmental landing and takeoff areas, and efflux gas receiving tunnel means below the surface of the field having entrances in said areas receiving the downward propulsive blasts from aircraft on said areas.

3. An airport for aircraft capable of steep angled or vertical takeoff and landing employing downwardly directed propulsive fluids comprising a generally horizontal field to be used by the aircraft during takeoff and landing, a raised mound around the field protecting the field against cross winds, the field being divided into segmental landing and takeoff areas, and efflux gas receiving tunnel means below the surface of the field having upwardly opening entrances in said segmental areas of the field receiving the downward propulsive blasts from aircraft on said areas, the mound having internal aircraft docking compartments and tunnels leading therefrom to said areas.

4. An airport for aircraft adapted for steep ascent and descent comprising a mound elevated above the surrounding terrain, the mound having an annularly depressed horizontal field area surrounded by a peripheral crest of the mound, aircraft tunnel means in the mound leading generally horizontally to the field area from said mound peripheral crest, a raised region surrounded by the annularly depressed horizontal area of the field, and a control tower on the raised region.

5. An airport for aircraft adapted for steep ascent and descent comprising a mound elevated above the surrounding terrain, the mound having an annularly depressed horizontal field area surrounded by a peripheral crest of the mound, a circular airport building on said crest, a raised region surrounded by the annularly depressed horizontal area of the field, a control tower on the raised region, said crest and region sloping downwardly to the field, and spaced aircraft arresting fences on the sloping areas of said crest and raised region.

6. An airport for aircraft capable of steep angled or vertical takeoff and landing employing downwardly directed propulsive fluids comprising a generally horizontal field to be used by the aircraft during takeoff and landing, a raised mound around the field protecting the field against cross winds, the field being divided into segmental landing and takeoff areas, and efflux gas receiving tunnel means for receiving the downward propulsive blasts from aircraft on said areas, said tunnel means including an annular tunnel below the surface of the field, blast-receiving entrances for the tunnel open at said areas of the field, and gas vents leading from the tunnel to the atmosphere at points between said areas.

7. An airport for aircraft capable of steep angled or vertical takeoff and landing employing downwardly directed propulsive fluids comprising a generally horizontal field to be used by the aircraft during takeoff and landing, a raised mound around the field protecting the field against cross winds, the field being divided into segmental landing and takeoff areas, and efflux gas receiving tunnel means for receiving the downward propulsive blasts from aircraft on said areas, said tunnel means including an annular tunnel below the surface of the field, blast-receiving entrances for the tunnel open at said areas of the field, antennas at said entrances emanating distinctive flight path signals to facilitate the landing of the aircraft at said blast-receiving entrances, and gas vents for the tunnel between said areas.

8. An airport for aircraft capable of steep angled or vertical takeoff and landing employing downwardly directed propulsive fluids comprising a generally horizontal field to be used by the aircraft during takeoff and landing, a raised mound around the field protecting the field against cross winds, the field being divided into segmental landing and takeoff areas, and efflux gas receiving tunnel means for receiving the downward propulsive blasts from aircraft on said areas, said tunnel means including an annular tunnel below the surface of the field, blast-receiving entrances for the tunnel open at said areas of the field, distinctive light emitting means for said entrances of the several areas to facilitate the landing of aircraft at the blast receiving entrances, and gas vents for the tunnel between said areas.

9. An airport for vertical rising aircraft comprising an annular field divided into a plurality of segmental landing and takeoff areas, a wall surrounding the field having substantially horizontal radial tunnels leading to said areas of the field to permit movement of the aircraft to and from the areas, docking and servicing rooms under the wall communicating with the tunnels, and turntables at the junctures of the tunnels and rooms facilitating movement of aircraft therethrough.

10. An airport for vertical rising aircraft comprising an annular field divided into a plurality of segmental landing and takeoff areas, a wall surrounding the field having substantially horizontal radial tunnels leading to said areas to permit movement of the aircraft to and from the areas of the field, power driven conveyor means for moving the aircraft in the tunnels, docking and servicing rooms under the wall communicating with the tunnels, and turntables at the junctures of the tunnels and rooms facilitating movement of aircraft therethrough.

11. An airport for aircraft capable of steep angled takeoff and landing comprising a generally horizontal field to be used by the aircraft during takeoff and landing, a raised central region having a surface sloping upwardly and radially inward from the field, a control tower on the top of said region, a raised mound encircling the field and presenting a surface sloping downwardly and inwardly to the field, the field and said surfaces of the region and mound constituting a sound reflector for directing and focusing the aircraft noises skyward, and aircraft arresting fences extending generally radially across the sloping surface of the mound, the field and the sloping surface of the central region, said arresting fences spaced apart to divide the field into a plurality of segmental landing and take-off areas.

References Cited in the file of this patent

UNITED STATES PATENTS

| | | |
|---|---|---|
| 783,769 | Wright | Feb. 28, 1905 |
| 1,310,057 | Caspar | July 15, 1919 |
| 1,388,319 | Backus | Aug. 23, 1921 |
| 1,526,268 | Dobie | Feb. 10, 1925 |
| 1,666,354 | Schwerdtfeger | Apr. 17, 1928 |
| 1,793,498 | Heritier | Feb. 24, 1931 |
| 1,842,411 | Ladd | Jan. 26, 1932 |
| 1,843,640 | Jackson et al. | Feb. 2, 1932 |
| 1,902,205 | Webster | Mar. 21, 1933 |
| 1,915,297 | Cuntz | June 27, 1933 |
| 2,395,528 | Andersen | Feb. 26, 1946 |
| 2,400,841 | Rogers | May 21, 1946 |
| 2,435,988 | Varian | Feb. 17, 1948 |
| 2,465,936 | Schultz | Mar. 29, 1949 |
| 2,638,588 | Riblet | May 12, 1953 |
| 2,674,335 | Lemmerman | Apr. 6, 1954 |

FOREIGN PATENTS

| | | |
|---|---|---|
| 567,002 | Germany | Dec. 24, 1932 |

OTHER REFERENCES

Aero Digest, May 1, 1944, pages 56–58 relied upon.